July 26, 1960 N. CURTIS 2,946,849

DATA REPRODUCING APPARATUS

Filed Dec. 8, 1958 2 Sheets-Sheet 1

INVENTOR.
NICHOLAS CURTIS

BY

Kane, Dalsimer and Kane

ATTORNEYS

July 26, 1960 N. CURTIS 2,946,849

DATA REPRODUCING APPARATUS

Filed Dec. 8, 1958 2 Sheets-Sheet 2

INVENTOR.
NICHOLAS CURTIS

BY Kane, Dalsimer and Kane

ATTORNEYS

United States Patent Office 2,946,849

Patented July 26, 1960

2,946,849

DATA REPRODUCING APPARATUS

Nicholas Curtis, Denville, N.J., assignor to Trans-Lux Corporation, New York, N.Y., a corporation of Delaware Filed Dec. 8, 1958, Ser. No. 778,972

12 Claims. (Cl. 178—7.1)

This invention relates to a structurally and functionally improved data reproducing apparatus.

In its more specific aspects, the invention contemplates the grouping of two or even three tape imprinting mechanisms in a manner such that the tapes and the indicia thereon are displayed substantially immediately after imprinting. So displayed, they may be scanned by an apparatus such as a television camera so that an improved and readily legible grouping of these tapes may be reproduced at relatively remote locations upon the screens of viewing units.

It is an object of the invention to furnish an assembly which may readily be provided and maintained and which assembly will operate over long periods of time with freedom from difficulty so as to reproduce desired data.

With these and other objects in mind, reference is had to the attached sheet of drawings, illustrating one practical embodiment of the invention in which.

Figure 1:
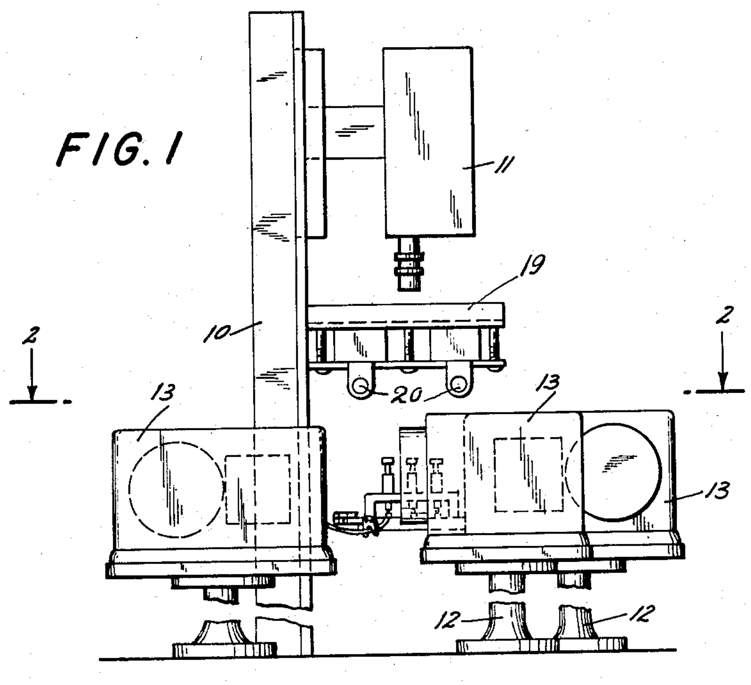
Fig. 1 is a diagrammatic representation of an assembly of apparatus.

In these views, the numeral 10 indicates a suitable support upon which there may be mounted a scanning apparatus such as a television camera 11. Also mounted upon suitable supports 12 are tape imprinting and feeding mechanisms generally indicated at 13. In the illustrated embodiment, three of these units are present and as shown especially in Fig. 2 each of them is provided with a discharge aperture or zone 14 from which the printed tape 15 emerges. As also shown in this view two of these units are disposed one to each side of a tape supporting means or deck 16 which constitutes a display station for the three tapes 15.

By arranging the apparatus in this manner, it is feasible to have a tape traverse the surface of the support 16 and almost immediately after it has been imprinted by the mechanism of unit 13. This is highly desirable in the case of stock, produce and other market quotations in which the viewer desires to be substantially current with the market as evidenced by the quotations imprinted on the tape.

To move the tapes over the supporting member providing the display station, motor driven reels 17 are employed individual to each of the tapes. The motors may conveniently be mounted on different levels by providing suitable supports 18 so that the different motors and reels may be readily serviced. In accordance with conventional construction a slipping clutch structure may be embodied in each of the motor-reel assemblies. Accordingly, while the reel will tend to rotate, no damage will occur to the parts when a slow or inadequate feed of tape occurs. Otherwise the motors may be controlled as hereinafter brought out.

Figure 2:
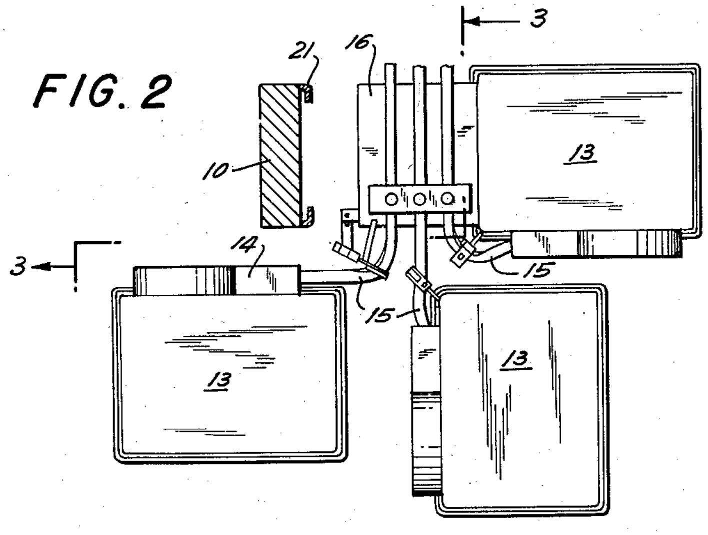
Fig. 2 is a sectional plan view taken along the line 2—2 in the direction of the arrows as indicated in Fig. 1.
Figures 3, 5:
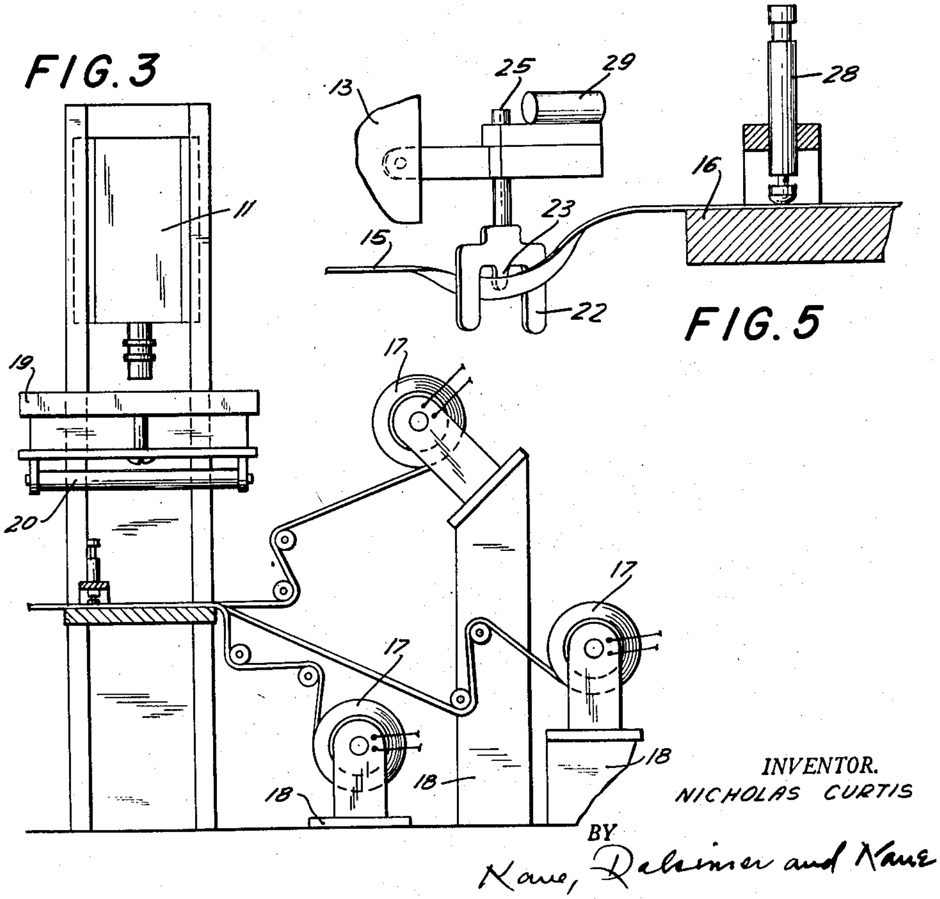
Fig. 3 is a sectional side view taken along the line 3—3 in the direction of the arrows as indicated in Fig. 2.
Fig. 5 is a partially sectional side view of a detail of mechanism.

Above the display station defined by support member 16, a mounting 19 for an illuminating source 20 may be disposed. Conveniently and as shown in Fig. 2 support 10 may provide a slide structure 21. Thus, the distance between the source of illumination and the deck 16 may be varied as necessary. The same slide structure may adjustably accommodate camera 11 which accordingly may also have its height above the deck readily adjusted.

Figure 4:
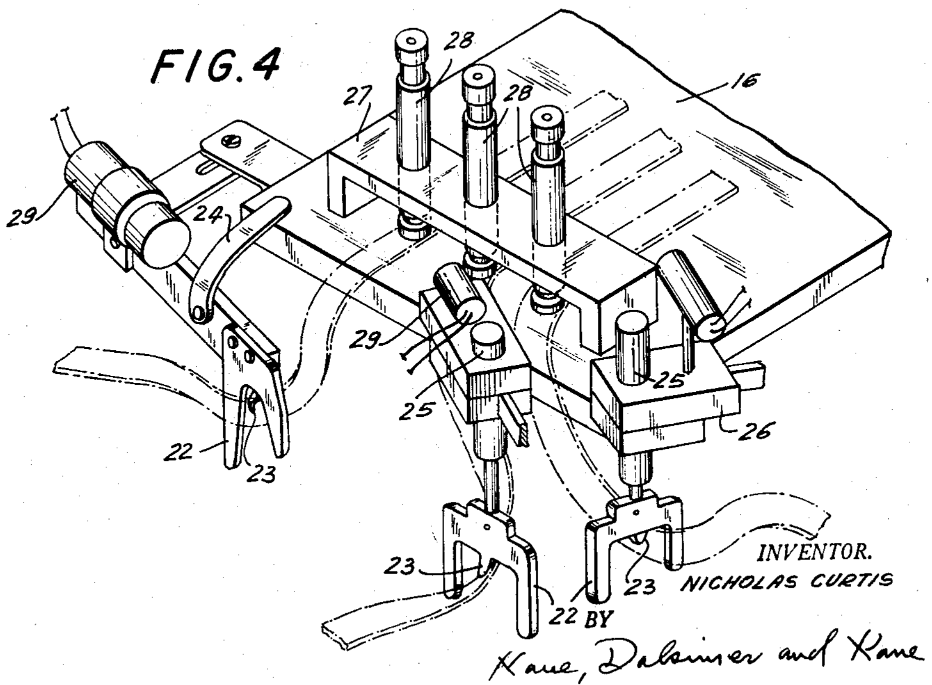
Fig. 4 is a fragmentary perspective view of certain of the controlling mechanisms included in the apparatus.

As will be appreciated with the different tapes converging from the three units to paths at which they extend parallel to each other in traversing deck 16, difficulty would normally exist incident to a kinking or other undesirable disposition of the tape as it moved through that station. To overcome this difficulty and as especially shown in Fig. 4, guide members are provided in the form of forks 22 embracing pairs of spaced arms 22 and between which tape-contacting fingers 23 are arranged. These forks in the case of the left hand unit shown in Fig. 4 may be movably supported by a flexible strip 24. Otherwise, they may have their stems 25 supported for rotation and reciprocation by blocks 26. Regardless of the particular form of mounting employed, these guides will adjust their positions according to the degree of tension exterted upon any given tape with which one of them cooperates. Therefore, the tape in emerging from the discharge zone of a printer, may, as shown in Figs. 2 and 4, follow a tortuous path and have one or their other edge inclined upwardly. However, after passing through the guides provided by the forks, they will approach the surface of the deck member 16 so as to tend to lie flush against the latter.

To assure such disposition, a supporting bracket 27 may have its ends attached to the member 16. This bracket slidably supports plungers 28. The latter have lower head portions 29, the under surfaces of which are convexly rounded. In this manner, those head portions, while riding in contact with tape surfaces, will not tend to smudge indicia imprinted upon that surface. However, they will assure that the tape in passing over the deck assumes a position parallel to other tapes and in a single plane within the field of the camera 11 so that a sharp image of the imprinting upon the tape is impinged upon the vidicon of the camera. The fact that the forked guiding members in addition to swiveling move vertically may be employed to advantage.

More particularly, switches 29 of the mercury type may be operatively connected to these members. So connected, it is apparent that as they move upwardly due to increasing tension on the tape, the switches may be opened. These switches are conveniently in series with the motor-reel assemblies 17. Therefore, if one or more of the tapes is feeding from the imprinting unit at a speed less than the take-up action of the reel, the circuit will be opened to disconnect the motor drive. Conversely, with a tape feeding from one of the units 13 and the corresponding motor-driven reel either stopped to tending to move at a slow speed, a loop will be formed in the tape. That loop will permit the corresponding guiding member to move downwardly. This will operate the switch connected therewith, to either initiate the motor operation, or to speed up that operation. In this manner, excess tape slack is taken up.

In any event, it will be understood that with an apparatus such as the foregoing, two or even three tape imprinting and feeding units may be grouped together so that the quotations appearing thereon will almost immediately be displayed on the support 16 or its equivalent. There will be no danger of the tapes kinking or being twisted. Therefore, a scanning device such as the camera 11 will have the tapes closely adjacent and parallel to each other within its field. The field may be enlarged or reduced by shifting the camera along support 10. The tapes will be adequately illuminated and the images will be reproduced by receivers in circuit with the scanning device.

As will be understood, the present teachings may also be used where direct viewing is resorted to. Under these circumstances, no television camera would be employed. Rather, under considerable illumination, the images of the three tapes might be reflected on a translucent surface such as a screen and from the display station as shown in the present drawings. In such an optical system, it is obvious that the usual lens units would be included. Instead of a reflecting system, direct projection might be resorted to to increase the light definition. In that case, with the supporting member 16 transparent or else cut out, a source of illumination would direct its rays through the three tapes or their equivalents. Accordingly, light images would be capable of being properly focused and reproduced on a member such as a screen. The optical system would, of course, include the usual condenser and objective lens assemblies.

Thus, among others, the several objects of the invention are achieved. Obviously, numerous changes in structure and rearrangement of the parts may be resorted to, without departing from the spirit of the invention as defined by the claims:

I claim:

1. In an apparatus of the character described, a pair of tape-printing and feeding mechanisms each having a zone from which imprinted tape is discharged, tape-supporting means providing a display station therefor, said mechanisms being disposed in positions at which the tapes discharged thereby move toward each other, a television camera, means for mounting such camera to encompass within its field tapes displayed at such station, means interposed between said tape-supporting means and the discharge zones of the said mechanisms for guiding the tapes in movements converging upon the display station and causing them to traverse the surface of said supporting means in parallel relationship and means individual to each tape for drawing the same across such display station.

2. In an apparatus as defined in claim 1, said camera being vertically spaced from and having its axis disposed in a plane normal to said supporting means and the latter extending horizontally.

3. In an apparatus as defined in claim 2, and means whereby said camera may be adjusted towards and away from said supporting means.

4. In an apparatus as defined in claim 1 and movable tape-flattening means interposed between said guiding means and the effective display area of said supporting means to ride against the surfaces of the tapes.

5. In an apparatus as defined in claim 4 and said flattening means comprising slidably mounted plungers having rounded tape-engaging ends.

6. In an apparatus as defined in claim 1, and means for mounting said guiding means for movement with respect to said supporting means to accommodate the tapes therethrough under varying conditions of tension as developed by said tape-drawing means.

7. In an apparatus as defined in claim 1, and motors for drawing the tapes across said supporting means.

8. In an apparatus as defined in claim 7, movable means for controlling the motors and said drawing means, said guiding means being movably supported and means operatively connecting said controlling means with said guiding means.

9. In an apparatus as defined in claim 1, each of said guiding means comprising a member having a pair of arms spaced from each other to slidably accommodate between them a moving tape and means for supporting the members to have vertical and swinging movements with respect to said supporting means.

10. In an apparatus as defined in claim 9 and a tape-engaging guiding finger forming a part of each member and extending between the arms of the latter.

11. In an apparatus as defined in claim 1, a third and similar printing mechanism, the first two mechanisms having discharge zones arranged to opposite sides of said supporting means to discharge their tapes towards each other, the third mechanism having its discharge zone in line with said supporting means to move a tape in a direction parallel to the movements of the other two tapes through said display station and all of said mechanisms being arranged immediately adjacent said supporting means.

12. In an apparatus of the character described, three similar tape-printing and feeding mechanisms each having a zone from which imprinted tape is discharged, tape-supporting means providing a display station therefor, two of said mechanisms having their discharge zones arranged to opposite sides of said supporting means to discharge their tapes towards each other, the third mechanism having its discharge zone in line with said supporting means to move a tape in a direction parallel to the movements of the other two tapes through said display station, all three of said mechanisms being arranged immediately adjacent said supporting means, tape-viewing means disposed in operative relationship to said station to encompass with its field the displayed tapes and means interposed between said supporting means and the discharge zones of said mechanisms for guarding against a kinking of and guiding the tapes in movements converging upon the display station.

References Cited in the file of this patent

UNITED STATES PATENTS

| | | |
|---|---|---|
| 2,517,797 | McFarlane | Aug. 8, 1950 |
| 2,638,498 | De France et al. | May 12, 1953 |
| 2,839,602 | Fries | June 17, 1958 |